April 24, 1962 R. S. FARR ET AL 3,030,755
SELF-CLEANING FILTER
Filed May 25, 1956 3 Sheets-Sheet 1
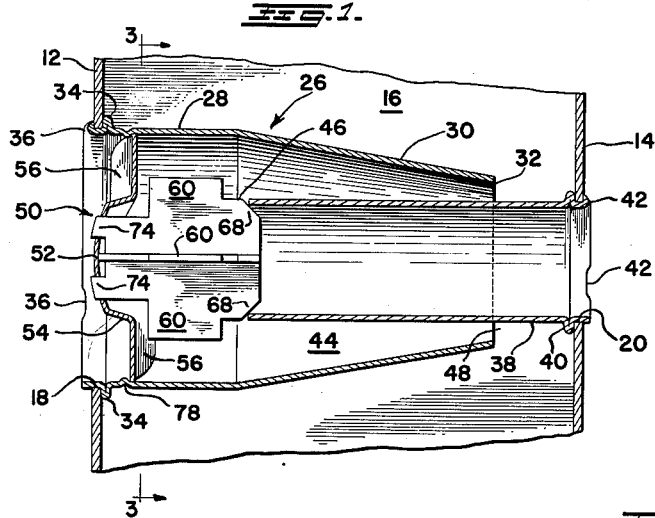
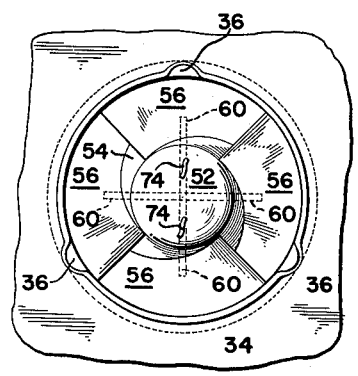
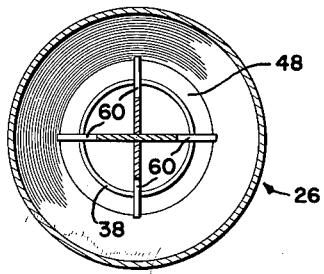
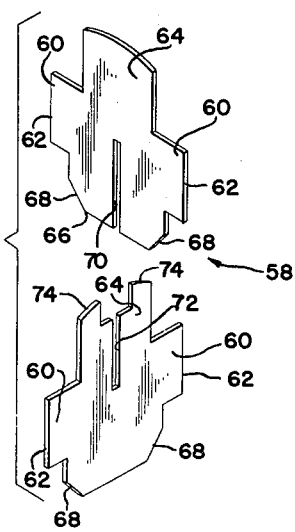
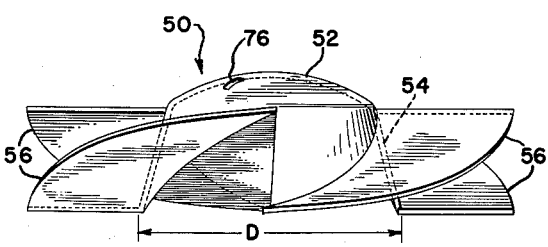
INVENTORS
RICHARD S. FARR
ALLEN W. HARDY
BY *Mead, Browne, Schuyler & Beveridge*
ATTORNEY

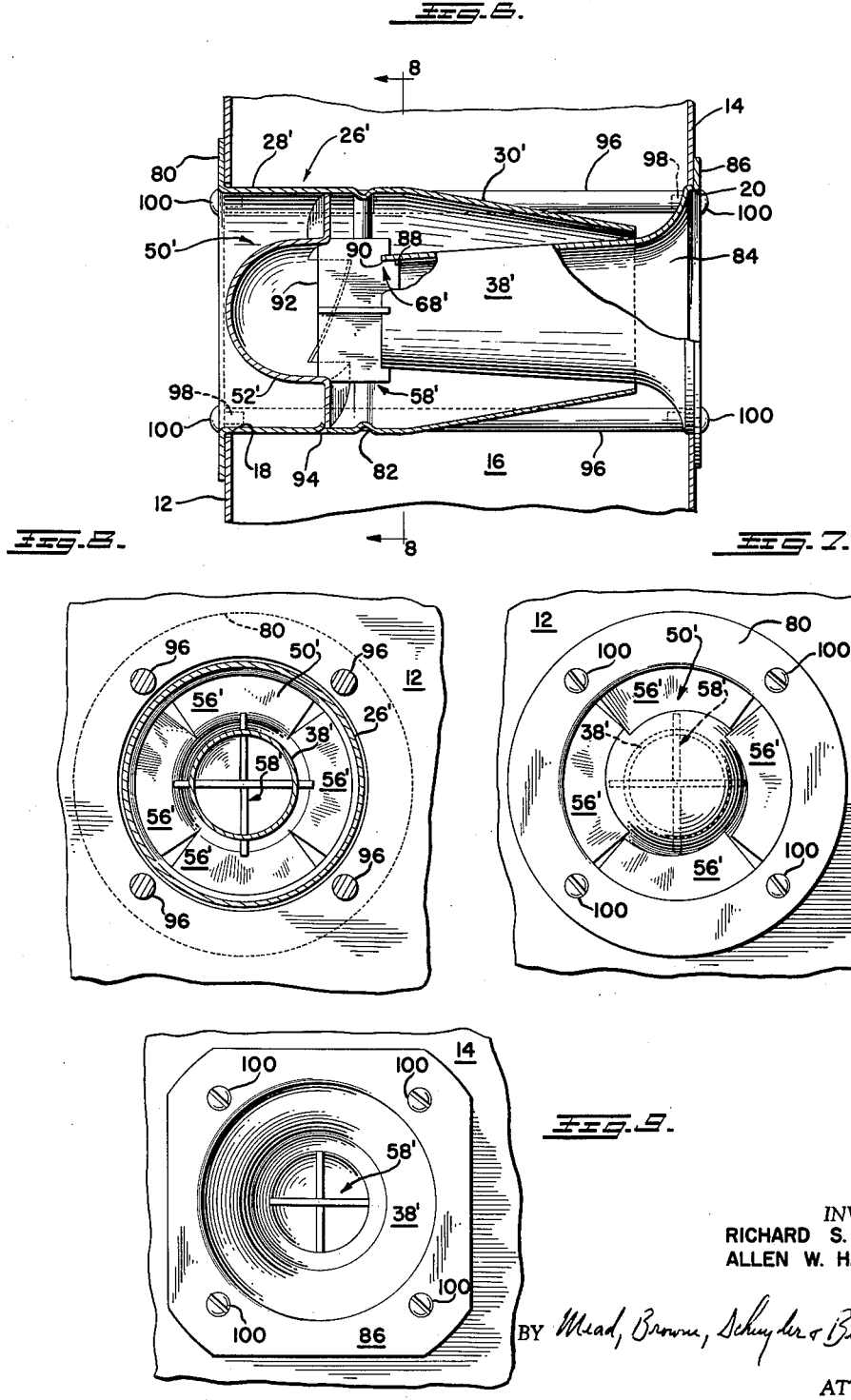

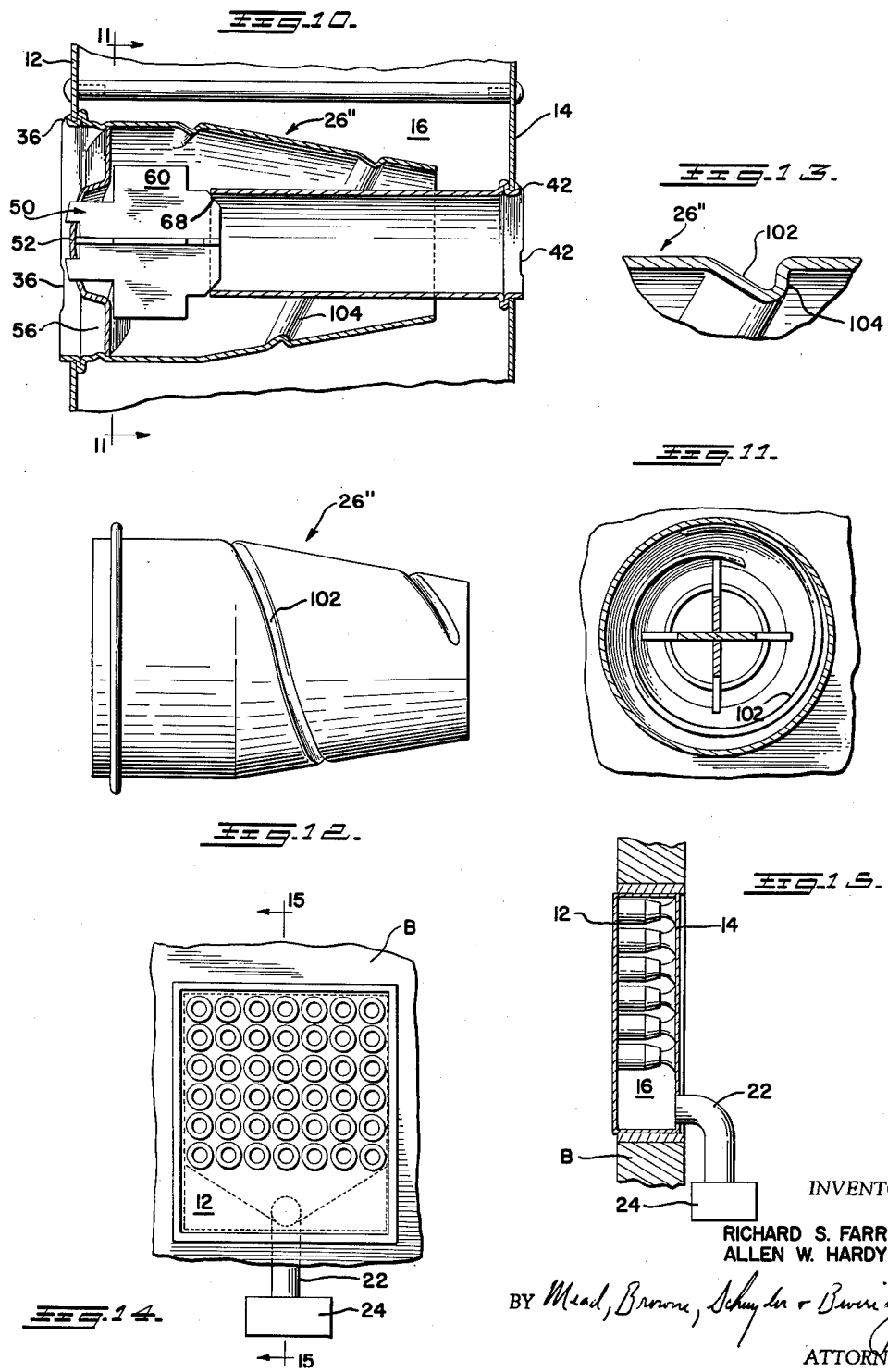

United States Patent Office 3,030,755
Patented Apr. 24, 1962

3,030,755
SELF-CLEANING FILTER
Richard S. Farr and Allen W. Hardy, Los Angeles, Calif., assignors to Farr Company, Los Angeles, Calif., a corporation of California
Filed May 25, 1956, Ser. No. 587,325
4 Claims. (Cl. 55—456)

This invention relates to filtering apparatus, and more particularly to a self-cleaning filter especially adapted to continuously and efficiently separate fine microscopic particles, which may be either solid or liquid, from a continuously flowing stream of air or other gas.

This application is in part a continuation of our prior application Serial No. 342,409, filed March 16, 1953 (now abandoned), which in turn was a continuation-in-part of our application Serial No. 309,674, filed September 15, 1952 (now abandoned) and in part a continuation of our copending application Serial No. 531,040, filed August 29, 1955 (now abandoned).

Throughout the following description, the term "air" is used to refer to the gas which is to be filtered and the term "particle" is employed to refer to the impurities which are separated or filtered from the gas. It will be understood that the term "air" is employed for convenience and that the filter will operate equally well upon other gaseous fluids. The term "particle" is to be understood as including both solid particles and liquid droplets.

Air cleaning or filtration becomes increasingly important as the complexity, cost and output of devices using air for combustion, cooling or ventilation rises. A satisfactory filter or air cleaner should be compact, have a long service life, have a high filtering efficiency on a wide range of sizes of particulate matter, and should require a minimum of attention and servicing. The inertial separators or cyclonic type air filters or cleaners have inherent possibilities of fulfilling most of the foregoing requirements. However, inherent characteristics of filters of the foregoing type render the achievement of a filter in which all desirable characteristics are simultaneously present exceedingly difficult. For example, high filtering efficiency is often achieved only at the expense of an undesirable amount of pressure loss within the filter. Further, the efficiency of inertial separators of cyclonic type filters drops off very rapidly as the size of the particles handled by the filter decreases. This is particularly true as the size of particle handled by a cyclonic type filter decreases into the microscopic range.

Another problem presented in cyclonic filters is the existence of a critical range of particle sizes. Because of the characteristics of filters of this general type, under certain conditions the filtering efficiency of a cyclonic filter has been found to drop off when particles of a certain size are present in the entering air stream. The filter will handle, with a satisfactory degree of filtering efficiency, particles both larger and smaller than this critical size but will be found to have a low filtering efficiency upon particles within the critical range.

Since the cyclonic type filter has many advantages from other standpoints, the present invention is particularly directed toward the achievement of a cyclonic filter especially adapted to handle particles in the microscopic range of particle sizes in which the foregoing problems are effectively solved.

A primary object of our invention is to provide a cyclonic air filter having a high filtering efficiency in removing fine microscopic particles continuously from a continuously flowing air stream.

Another object of our invention is to provide a filter of this type having a high filtering efficiency over a substantial range of microscopic particle sizes and in which the existence of a critical range of particle sizes is effectively eliminated.

Another object of our invention is to provide air filtering apparatus wherein a continuous disposition of the separated impurities is accomplished, thereby enabling the filter to be operated continuously over long periods of time without cleaning.

Another object of our invention is to provide a highly efficient self-cleaning air filter which will provide a continuous stream of filtered air with a negligible or minimum pressure loss within the filter.

Another object of our invention is to provide a highly efficient self-cleaning air filter which is extremely compact, consists of a minimum number of parts, and is substantially unaffected by vibration.

As has been stated above, the present invention is especially adapted to achieve improved filtering efficiencies within the miscroscopic range of particle sizes. For the purposes of a general description, it may be stated that it is generally understood in this field that the term "microscopic" refers to those particles having a mean particle size of less than 10 microns (25,400 microns equal one inch). Previously known so-called "high efficiency" cyclonic filters have a generally satisfactory filtering efficiency upon particle sizes down to the range just above the high end of the microscopic size range of particles. At this point, the efficiency curve of previously known cyclonic filters drops off sharply from a substantially constant high efficiency (i.e. above 95% in the range of particle sizes from 1,000 microns down to 25 microns) to approximately 75% as the particle size passes the 10 micron mark and further to approximately 50% for particles adjacent the high end of the microscopic range. The filter of the present invention maintains the aforementioned substantially constant value of high efficiency over a range of particle sizes extending well into the microscopic range.

Since the larger particles may be efficiently and more economically filtered from the air by other types of filters—ordinary screens for example—the filter of this application is especially concerned with efficiently filtering particles in the microscopic range and slightly larger. As such, in many applications the filter disclosed herein is used as a secondary filter in conjunction with conventional filters which may remove the coarser particles from an air stream. Because of the physical dimensions required to efficiently filter particles of the aforementioned fineness, there is a limiting maximum size of particle which can pass through the filter disclosed herein and it will be assumed that, where necessary, suitable means may be used in combination with the filter about to be described to assure that particles beyond this limiting maximum size are not presented to the filter.

Other objects and features of our invention will become apparent from the following description taken in conjunction with the accompanying drawings.

In the drawings:

FIG. 1 is a longitudinal cross sectional view of an individual filter unit embodying our invention;

FIG. 2 is a detail front view of the inlet end of the filter of FIG. 1;

FIG. 3 is a cross sectional view of the filter of FIG. 1 taken on the line 3—3 of FIG. 1;

FIG. 4 is a detail side view of the baffle member of the filter of FIG. 1;

FIG. 5 is an exploded perspective view of the air straightening vane assembly of the filter of FIG. 1;

FIG. 6 is a longitudinal cross sectional view of a modified form of the filter of FIG. 1;

FIG. 7 is a detail front view of the inlet end of the filter assembly of FIG. 6;

FIG. 8 is a cross sectional view of the filter of FIG. 6 taken on the line 8—8 of FIG. 6;

FIG. 9 is a detail view of the outlet end of the filter of FIG. 6;

FIG. 10 is a longitudinal cross sectional view of a modified form of the filter of FIG. 1;

FIG. 11 is a cross sectional view of the filter of FIG. 10 taken on the line 11—11 of FIG. 10;

FIG. 12 is a detail view of the inlet tube element of the filter of FIG. 10;

FIG. 13 is a detail cross sectional view of the spiral rib of the filter of FIG. 10;

FIG. 14 is a front view of a bank of filter units embodying the present invention; and FIG. 15 is a cross sectional view of the bank of filters shown in FIG. 14 taken on the line 15—15 of FIG. 14.

Referring now to FIGS. 1 through 5, one embodiment of a filter unit according to the present invention is seen to be mounted in and extend between front wall 12 and rear wall 14 of chamber 16. The inlet end of the filter unit is mounted within an inlet opening 18 in front wall 12 while the rear or discharge end of the filter unit assembly is received in an outlet opening 20 in rear wall 14 which is in axial alignment with inlet opening 18. As will be understood by reference to FIGS. 14 and 15, the usual application of the present invention requires the use of a plurality of individual filter units, the actual number being determined by the rate at which filtered air is required in the particular application. With the exception of inlet openings 18 and outlet openings 20, chamber 16 is closed except for a bleed-off connection 22 (FIGS. 14 and 15) which is operatively connected to some suitable means such as a pump or aspirator illustrated schematically at 24 for continuously withdrawing a controlled amount of air from the interior of chamber 16.

Each of the individual filter unit assemblies includes an open-ended inlet tube member 26 having a generally cylindrical forward portion 28 and a rearwardly convergent frusto-conical rear end portion 30 which terminates at 32 in an open discharge end. The inlet tube member may be provided at its forward end with any suitable means such as flange 34 and crimped portions 36 for securely mounting inlet tube member 26 within inlet opening 18 of front wall 12.

A cylindrical discharge or outlet tube 38 is mounted within outlet opening 20 and projects forwardly into the interior of chamber 16 and through opening 32 a substantial axial distance into the interior of inlet tube 26, as can be observed from viewing FIG. 1. As in the case of inlet tube 26, any suitable means such as flange 40 and cooperating crimped portions 42 may be employed to secure outlet tube 38 within outlet opening 20. Inlet tube 26 and outlet tube 38 are coaxial with each other and the axially overalpping portions of the respective tubes may be said to define an annular separation chamber 44 which, in the disclosed embodiment, is substantially coextensive with the convergent portion of inlet tube 26.

Inlet tube 38 is open at its forward or inlet end 46 to receive filtered air from separation chamber 44 to permit the filtered air to be discharged from the filter. Because the diameter of outlet tube 38 at its entrance into the inlet tube is less than the diameter of the opening in the inlet tube at its rearward end 32, an annular discharge opening 48 exists at the rear or discharge end of separation chamber 44.

A flow directing baffle assembly 50 is mounted within inlet tube 26 adjacent the inlet end thereof. As best seen in FIG. 4, baffle 50 includes a centrally located hub having a rounded nose portion 52 and rearwardly diverging side walls 54 upon which are mounted radially extending helical vanes 56. Helical vanes 56 direct air entering inlet tube 26 into a spiral path, and the radial extent of side walls 54 is such that the flow of air entering inlet tube 26 is confined to a region adjacent the interior wall surface of the inlet tube. The effective diameter D (FIG. 4) of nose portion 52 and side walls 54 of the baffle is substantially greater than the diameter of outlet tube 38, and, by this relationship, air entering the inlet tube is diverted to flow radially outwardly of the outlet tube, thus preventing air from entering the outlet tube directly from the inlet opening.

Baffle asembly 50 causes air entering inlet tube 26 to flow in a spiral path closely adjacent the interior wall surface of the inlet tube. The circular flow of air entering the inlet tube creates a centrifugal force on particles carried in with the entering air stream and drives the particles radially outwardly to concentrate them closely adjacent the wall of the tube. The helical flow of the entering air stream continues down the interior wall surface of inlet tube 26 into separation chamber portion 44 where the converging walls 30 act to increase the centrifugal action upon particles in the air stream as the air stream flows helically toward annular discharge opening 48.

Because of the relative size of annular discharge opening 48 and the controlled amount of air withdrawn from chamber 16 by means 24, only a small portion of the entering air stream passes through opening 48. As will be developed in greater detail below, the large particles are accelerated by the helically flowing air stream and, by the time the particles reach annular discharge opening 48, the heavier or larger particles have been accelerated to a degree whereby their motion is more or less independent of the actual path of air flow. The smaller or lighter particles tend to follow the air flow more faithfully and a large percentage of these are ultimately carried out of separation chamber 44 by the controlled amount of air permitted to pass through discharge opening 48. Air which cannot pass through opening 48 continues its spiral flow but reverses its axial direction and flows helically back toward the inlet end of outlet tube 38. The high velocity entering air stream adjacent the inner wall surface of inlet tube 26 confines this return flow to an annular region closely adjacent the outer wall surface of outlet tube 38. Since the air flowing along outlet tube 38 is still flowing in a helical path, particles which are still suspended in the air stream are acted upon by a centrifugal force created by the circular component of the flow and may be driven radially outwardly to a position where the rearwardly spiraling flow can separate the particles from the returning air stream. As the returning air stream reaches the inlet end of outlet tube 38, it becomes desirable to eliminate the circular component of flow of the air stream and this is accomplished by an air straightening vane assembly indicated generally by the numeral 58.

Air straightening vane assembly 58 comprises a plurality of flat radially extending vanes, the number of vanes in general corresponding to the number of helical vanes 56 on baffle assembly 50. In the construction illustrated in FIGS. 1 through 5, four straightening vanes 60 are employed and may be conveniently constructed in pairs as best seen in FIG. 5. In this construction, one of the vane elements is formed from a piece of sheet material wherein the oppositely extending vane portions 60 comprise the main body of the element. Vanes 60 terminate at opposite edges 62 which are spaced apart a distance substantially equal to the maximum diameter D of the hub portion of baffle member 50. A forwardly projecting end portion 64 extends forwardly from the vanes and is shaped to be received within the interior of the hub portion of baffle 50.

The rearward end 66 of the first vane element is provided with a pair of shoulders 68 which are adapted to seat in the open end 46 of outlet tube 38. A longitudinally extending slot 70 is formed in the first vane element and is adapted to mate with a complementary slot 72 in the second vane element. The second vane element, with the exception of the orientation of slot 72 and a pair of lugs 74 on its forward end portion, is substantially identical to the previously described vane member and like reference numerals are employed to indicate corresponding portions of the second vane element. Lugs 74 are adapted to be received within slots 76 cut in the nose portion of baffle 50.

The foregoing construction is especially adapted for convenient assembling individual filter units. The steps of assembly may be briefly summarized as follows.

A related pair of air straightening vane members as illustrated in FIG. 5 are assembled by sliding the two members together so that the bottoms of the respective slots 70 and 72 abut each other. The two members are then brazed or welded into a subassembly with the two members disposed at right angles to each other as best appreciated from the cross sectional view of FIG. 3. Lugs 74 of the vane assembly are then inserted into mating slots 76 of a baffle member 50 and headed over to secure the air straightening vane assembly to its baffle member 50. The assembled straightening vanes and baffle are then mounted within the inlet end of an outlet tube and may be secured to the outlet tube as by brazing. The assembled outlet tube 38, straightening vane assembly 58 and baffle 50 are then inserted into an inlet tube from the inlet end. When the parts are located in the relative positions shown in FIG. 1, the inlet tube is crimped to provide a plurality of inwardly extending projections such as 78 which prevent relative axial movement between the inlet tube member 26 and the other parts of the filter unit. The individual filter units are then assembled into the chamber defining construction, the axial locations of inlet openings 18 and outlet openings 20 assuring the correct alignment of the components of the filter unit.

In FIGS. 6 through 9, a modified form of the previously described filter unit is disclosed. The general arrangement of parts, as well as the operation of the filter of FIGS. 6 through 9 is substantially the same as the previously described embodiment of FIGS. 1 through 5; the two embodiments differ mainly in certain variations in form of the individual parts. In general, these variations may be said to be refinements of the basic form of invention illustrated in FIGS. 1 through 5, the refinements achieving a decreased pressure loss within the filter and permitting a construction which may be disassembled somewhat more conveniently than the previously described arrangement of parts. Since the basic construction of the filters of FIGS. 1 through 5 and 6 through 9 is substantially the same, the description of the embodiment of FIGS. 6 through 9 will be largely confined to the modifications.

Referring now to FIG. 6, the inlet tube element 26' of this embodiment includes a cylindrical forward end portion 28' and a rearwardly convergent rear end portion 30' substantially similar to the forward and rear end portions 28 and 30 respectively, of the unit shown in FIG. 1. Inlet tube member 26' differs from the FIG. 1 embodiment in two respects—the provision of a radially extending mounting flange 80 and an inwardly projecting abutment ring 82 located adjacent the juncture of forward and rear end portions 28' and 30', respectively. As best seen in FIGS. 6 and 7, flange 80 is adapted to overlie front wall 12 around the periphery of inlet opening 18. Abutment ring 82 acts as a seat to assist in the location of a modified baffle assembly 50' and permits a somewhat different assembly procedure from that described above.

Outlet tube 38' differs from the truly cylindrical outlet tube 38 of FIG. 1 in that outlet tube 38' is rearwardly divergent and flares outwardly at its discharge end to form a bell-mouthed discharge opening 84. The form of outlet tube 38' reduces pressure loss within the outlet tube as compared to that present in the straight cylindrical form illustrated in FIGS. 1 through 5. A radially extending mounting flange 86 is formed around the discharge opening of outlet tube 38' to overlie the portion of rear wall 14 immediately surrounding outlet opening 20 (see FIG. 9).

Baffle element 50' of the FIG. 6 embodiment differs from the form of baffle element 50 of FIG. 4 in that a smoothly curved nose portion 52' is provided to achieve a smoother flow of air entering the filtered unit. Like the modified form of outlet tube 38', the smoothly rounded nose portion acts to reduce pressure loss within the filter unit.

Straightening vane assembly 58' of the FIG. 6 embodiment is formed with a modified seating shoulder arrangement 68' in which the axial extending edges 88 of shoulders 68' are adapted to engage the inner wall of outlet tube 38' adjacent the inlet end thereof. Each axially extending shoulder edge 88 is continued a short distance into the vane portion 60' to provide a slot 90 whereby vane assembly 58' may be securely mounted on the inlet end of outlet tube 38'. Because of the different assembly procedure followed in this embodiment, the forward end portions 64 of the straightening vane assembly of FIG. 5 are no longer necessary, the forward edge 92 of vane assembly 58' being of a dimension whereby vane assembly 58' may enter into the interior of nose portion 52' only a short distance.

In assembling the embodiment of filter unit shown in FIGS. 6 through 9, the straightening vane assembly 58' is mounted upon the inlet end of outlet tube 38' by pressing the vane assembly axially of tube 38' until the forward edge 46' of the tube is seated in slots 90. The vanes may then be secured in position as by brazing, if desired.

Baffle member 50' is then inserted into the inlet end of inlet tube 26' until the helical vanes 56' abut against abutment flange 82. The walls of the inlet tube 26' are then crimped inwardly as at 94 to secure baffle 50 within the inlet tube. The assembled inlet tube 26' and baffle 50' may then be located within inlet opening 18 and the assembled outlet tube 38' and vane assembly 58' are then inserted through outlet opening 20 of rear wall 14. Rods 96 having internally threaded bores 98 at each end are then placed in position within chamber 16 in alignment with suitably located holes passing through the respective mounting flanges 80 and 86 and walls 12 and 14. Mounting flanges 80 and 86 are then drawn against walls 12 and 14 of the chamber by screws 100 which pass through the respective mounting flanges into threaded bores 98. The rods 96 act as a spacer and assure that straightening vane assembly 58' will be seated with the desired degree of firmness within the interior of nose portion 52' of the baffle assembly. The seating of straightening vanes 58' within nose portion 52' achieves the desired axial alignment between the components of the filter unit of FIG. 6.

The foregoing construction provides a filter unit which is somewhat more conveniently disassembled than the embodiment shown in FIGS. 1 through 5. It will be recognized of course that the respective means for mounting the filter units within chamber walls 12 and 14 could be interchanged.

As has been previously stated, one of the problems frequently encountered in the use of filters of the general type described above is the existence of a so-called critical range of particle sizes. Particles within the critical size range tend to depart from the flow of air within the filter in such a manner that these particles find their way into the filtered air issuing from the filter. The critical range is dependent upon many factors which include, among others, the physical dimensions of the filter, the rate of air flow through the filter, the specific gravity of the particles, etc. As a general rule, it may be said that a critical range of particle sizes will exist under certain conditions for any given filter of this general type. In some applications, the critical range of particle size is of little or no concern. For example, in some applications, particles falling within the critical size range may be present in the entering air in negligible or substantially non-existent quantities. In other cases, the critical particle size range may be of sufficient magnitude so that particles within this range may be handled by another filter operating in series.

As a general rule, however, the problem of a critical range of particle sizes grows increasingly important as the average size of the particle to be handled by the filter decreases. To overcome this problem, we have devised the filter construction illustrated in FIGS. 10 through 13 of the drawings.

Referring now to these figures, it will be seen that the filter illustrated differs from that shown in FIGS. 1 through 5 of the drawings only in that the inlet tube 26" is formed with an inwardly projecting spiral rib 102. Since the rib 102 must not interfere with the forward flow of fluid toward the inlet end of outlet tube 38", rib 102 projects only a small radial distance into the separation chamber. Compared to the radial dimension of the separation chamber, the rib may be said to be shallow or to project slightly into the separation chamber. The pitch or lead of spiral rib 102 is made to be equal to the pitch or lead of the spiral path of air imposed by helical vanes 56 of the baffle assembly. In other words, the spiral rib is so oriented that under normal conditions no air would ever flow transversely across the rib 102. Since the only particles which depart substantially from the spiral air flow within the separation chamber portion of the filter are those within the critical size range, spiral rib 102 offers a minimum interference to the action of the filter.

Particles within the critical size range tend to lose their axial component of velocity. Where spiral rib 102 is provided, a particle which loses its axial velocity will, in some portion of its circular path, strike the rearward face 104 of the spiral rib and thus be deflected toward annular discharge opening 48. Rearward face 104 is substantially normal to the longitudinal axis of the inlet tube although it is preferably inclined slightly toward discharge opening 48.

Since, under a given set of conditions for a given filter construction, there is only a limited region within the filter where the condition of equilibrium of particles within the crtical size range may occur, the function of spiral rib 102 might be best described as one of axially deflecting particles within the critical size range back into the flow path of the air in such a manner that the particle is moved beyond the axial region where the equilibrium condition may occur.

While the spiral rib 102 has been shown as being employed in the specific filter construction illustrated in FIGS. 1 through 5, it will be apparent that such a rib has utility in other filter construction and in fact is of general utility in cyclonic filters in general wherein the problem of a critical size range of particles is of significance.

Operation

In a basic sense, the operation of each of the embodiments of filters described above is the same. The various refinements disclosed in FIGS. 6 and 10 improve the efficiency of operation but, as stated, each of the individual filters has the same basic principles of operation. In the following description, reference will be made specifically to the filter disclosed in FIG. 1. However, it will be understood that such reference might equally well be made to the corresponding parts of the other embodiments.

In a typical application, a plurality of the individual filter units will be assembled in a bank in the manner shown in FIGS. 14 and 15 of the drawings. The bank of filters is mounted to completely block the air inlet opening to the area in which the filtered air is desired. For purposes of illustration, it will be assumed that the wall B represents the side of a diesel locomotive, the area to the left of the wall B in FIG. 15 being the atmosphere while the area to the right of the wall of FIG. 15 will be assumed to be the space from which the air intake of the engine withdraws the combustion air. In this case, the suction created by the air intake of the engine establishes a pressure differential between the atmospheric pressure existing at the inlet opening and the pressure at the outlet of the outlet tube.

In this particular application, bleed line 22 is connected to some suitable means 24 such as an aspirator or pump to continuously withdraw a controlled amount of air from within chamber 16.

Due to the pressure differential established between atmospheric pressure at the inlet opening and the reduced pressure occasioned by the air intake of the engine, air is withdrawn from the atmosphere through the filter units and enters the respective inlet tubes through spiral vanes 56.

In each of the filter units, vanes 56 impart a spiral flow to air entering the inlet tube which causes the entering air to flow rearwardly along the interior wall surface of inlet tube 26 in a generally helical path. Because of the rotary motion of the air, particles or impurities within the air are centrifugally driven radially outwardly toward the inner wall of the inlet tube. As the particles travel rearwardly along the inlet tube, the converging walls 30 of the separating chamber portion 44 of the inlet tube act to increase the centrifugal force acting on the particles, thereby increasing the concentration of particles adjacent the inlet tube wall. The particles continue to move along the inlet tube wall in their helical path until they reach the rearward end of the inlet tube where they are discharged through annular discharge opening 48 into the interior of the chamber 16.

Because of the spiral motion imparted to the unfiltered air entering the inlet tube through vanes 56, and the radial extent D of baffle 50, the entering air tends to hug the interior wall surface of inlet tube 26 during its helical flow rearwardly toward the annular discharge opening. In the absence of some throttling effect at annular discharge opening 48, a large portion of the air entering the filter unit would pass on through annular discharge opening 48 into the interior of chamber 16, thus greatly decreasing the amount of filtered air discharged from the discharge tube. While some air flow through the discharge opening 48 is desirable, it will be apparent that it is desirable to limit this flow of air for reasons which will be discussed below.

As previously stated, the disclosed filter constructions are especially adapted to handle fine microscopic particles. The particles or impurities within the air to be filtered will of course vary in size and mass. It will be apparent that the smaller or lighter particles tend to be more sensitive to the flow of air within the filter than the larger or heavier particles. That is to say that the lighter particles follow the flow path of the air more faithfully than the larger or heavier ones. During the rearward helical flow of air along inlet tube 26, the heavier particles tend to be accelerated by the air stream in such a manner that they will be flung through discharge opening 48 more or less independently of the actual air flow in the region of the discharge opening. The lighter particles tend to follow the air stream somewhat more faithfully and, by permitting a controlled amount of air to flow from inlet tube 26 through annular discharge opening 48 into chamber 16, many of the finer or lighter particles will be carried out with this controlled amount of air. However, the task of the filter is to supply a continuous stream of filtered air at the outlet tube and the more air which is permitted to flow into the chamber, the less air will be available at the outlet tube.

Three factors control the amount of air which issues from the inlet tube to the interior of the chamber 16. These are the size and configuration of the inlet opening, the pressure differential between the inlet end of the inlet tube and the outlet end of the outlet tube, and the rate at which air is withdrawn through bleed line 22. It has been found to be practical in most installations to limit the amount of air discharged through the annular discharge opening to a relatively small percentage of the amount of air entering the inlet tube. For most purposes, a filtering efficiency of approximately 98% of particles down to the 10 micron range may be achieved by withdrawing approximately 10% of the entering air through the annular discharge opening.

Air which does not pass through annular discharge opening 48 continues to flow in a spiral path, but reverses its axial direction and flows forwardly along the outer wall of outlet tube 38 toward its inlet end 46. The high velocity flow of the incoming air along the walls of inlet tube 26 confines the reversed axial flow to a region closely adjacent outlet tube 38. However, the air traveling along outlet tube 38 toward its inlet at 46 is still moving in a helical path and, as a result, a secondary separation of particles from air in this portion of the flow path is accomplished. The centrifugal force applied to particles by the spiral flow along outlet tube 38 tends to fling any remaining particles radially outwardly into the path of the rearwardly flowing incoming air. Because of the substantial axial distance between annular discharge opening 48 and the inlet end 46 of the outlet tube 38, a substantial amount of secondary separation can occur.

Spiral air flow along the outer wall of the outlet tube continues until the air reaches the region occupied by straightening vane assembly 58. The function of the straightening vanes is to change the spiral flow of the air into straight axial flow so that a minimum amount of pressure loss occurs within outlet tube D. As will be noted from FIG. 1, straightening vanes 60 extend radially beyond the outer wall of outlet tube 38 and thus a major portion of the straightening of the air flow may occur before the air actually enters the outlet tube. The axial extent of the straightening vanes likewise acts to reduce the pressure loss by providing a relatively large inlet to the outlet tube. Preferably the straightening vanes are terminated adjacent the inlet end of the outlet tube, see FIGS. 1, 6 and 10, to minimize the pressure loss within the outlet tube.

As previously stated, the over-all operation of the embodiment of the invention disclosed in FIG. 6 is substantially the same as that previously described for the embodiment of FIG. 1. By forming the outlet tube in the manner disclosed in FIG. 6, some improvement in the internal pressure loss characteristics of the filter may be achieved over the embodiment disclosed in FIG. 1.

Referring now to FIG. 10, it will be seen that the filter disclosed in FIG. 10 differs from that disclosed in FIG. 1 by the provision of the inwardly extending spiral rib 102. While this rib is specifically disclosed as being applied to the FIG. 1 embodiment, it will be recognized from the following description that this rib is equally applicable to the FIGURE 6 embodiment and, in fact, would find utility in cyclonic filters in general wherein the primary object is the separation of extremely fine or microscopic particles from a stream of gaseous fluid.

It is a known characteristic of most multiple tube cyclonic filters of the general type disclosed in this application that there exists a narrow range of particle sizes that tend to pass completely through the filter rather than be removed by the filter. This critical particle size range is toward the large particle end of the total range of particle sizes handled by the filter. Particles larger or smaller than this critical range are removed more readily from the stream of fluid passing through the filter than are particles within the critical range. The explanation for the decrease in efficiency of removal of these critically sized particles states that the total resultant of all the dynamic, gravity and aerodynamic forces on the particle reaches an equilibrium condition wherein the axial velocity component of the particle decreases to zero. In this situation, the particles tend to accumulate into a doughnut-shaped cloud of particles in rotation at a fixed location in the separating chamber. This cloud of particles may reach a size wherein certain portions of the cloud actually extend into the path of air flow leading into the outlet tube, thus permitting these particles to be discharged in the filtered air stream.

The spiral rib disclosed in FIG. 12 is designed to prevent the accumulation of particles into such a cloud. Because the axial lead of the spiral rib is substantially the same as the axial lead of the spiral air flow headed toward the discharge opening, particles which depart substantially from the path of air flow will strike the rear face 104 of the spiral rib and be deflected toward the annular discharge opening. In the case of particles which lose their axial velocity, that is, particles within the aforementioned critical size range, the spiral rib, having its steeper side 104 facing away from the inlet to the separating chamber and, by virtue of its helical direction being aligned with the spiral air flow adjacent the outer wall of the separating chamber, opposes the circular path into which the critically sized particles tend to move. Particles tending to follow the circular path strike against the rear side of face 104 of rib 102 and are deflected in the direction of the discharge opening and thus pass beyond the axial location where the equilibrium condition can occur.

From the foregoing explanation, it can be seen that the presence of the rib affords an over-all increase in the efficiency of the filter and effectively eliminates the existence of a critical size of particles which cannot be efficiently handled by the filter. There are many applications where efficient filtration of particles within the critical size range is of primary concern, and in these cases the presence or absence of a spiral rib of the type shown in FIG. 12 is the difference between successful or unsuccessful operation of the filter. In other applications, however, particles within the critical size range either do not exist in the stream of fluid entering the filter or are present in negligible quantities and successful and satisfactory operation of the filter may be achieved without the employment of the spiral rib.

While we have described and illustrated embodiments of our invention, we wish it to be understood that we do not intend to be restricted solely thereto but that we do intend to cover all modifications thereof which would be apparent to one skilled in the art and which come within the spirit and scope of our invention.

What we claim as our invention is:

1. A filter assembly for separating particles from a gaseous fluid, said assembly comprising a fluid inlet tube having a cylindrical forward portion and a rearwardly convergent rear portion terminating in an open end, a fluid outlet tube having an open inlet end located within said inlet tube, said outlet tube being mounted coaxially within said inlet tube and extending rearwardly thereof from said open inlet end through and beyond the open end of the inlet tube to define, with said inlet tube, an annular separation chamber substantially co-extensive with said convergent portion of said inlet tube, said chamber terminating in an annular discharge opening at the open end of the inlet tube, a baffle assembly mounted within said forward cylindrical portion of said inlet tube, said baffle assembly comprising a central hub portion having a plurality of helical vanes extending radially therefrom into engagement with the interior wall surface of said cylindrical portion, said central hub portion being axially aligned with the forward end of said inlet tube and having a greater diameter than the inlet end of said outlet tube, a plurality of radially extending straightening vanes extending axially between said central hub portion and the inlet end of said outlet tube, means on the forward ends of said straightening vanes engageable with cooperating means on said central hub portion for supporting the forward ends of said straightening vanes, and shoulders on the rear ends of said straightening vanes adapted to seat upon the inlet end of said outlet tube.

2. A filter assembly according to claim 1 wherein said means on the forward ends of said straightening vanes comprise forwardly projecting lugs and said cooperating means are defined by lug receiving slots in said central hub.

3. A filter assembly as defined in claim 1 wherein said outlet tube is rearwardly divergent and terminates in a bell mouth discharge opening at its rearward end.

4. A filter for separating particles in the microscopic size range from a gaseous fluid, said filter comprising an open-ended inlet tube having a fluid inlet opening at its forward end, said inlet tube having a cylindrical forward portion and a rearwardly convergent frusto-conical rearward portion extending rearwardly from said forward portion and terminating at a rearward end having an opening of a first diameter, an open-ended outlet tube having an external diameter less than said first diameter and having a fluid outlet opening at its rear end, means supporting said outlet tube in coaxial relationship with said inlet tube with the front portion of said outlet tube located in axially overlapping relationship with said frusto-conical portion of said inlet tube, said outlet tube extending rearwardly through and beyond the rearward end of said inlet tube, the axially overlapping portions of the inlet and outlet tubes defining an annular separation chamber extending rearwardly from the front end of said outlet tube and terminating at an annular particle discharge opening defined by the passage of said outlet tube through the rearward end of said inlet tube, a central baffle having a diameter greater than the diameter of said outlet tube mounted within said cylindrical forward portion of said inlet tube in forwardly spaced relationship from said outlet tube for directing into said separation chamber substantially all fluid entering said inlet tube, a plurality of helical vanes projecting radially from said central baffle for directing fluid entering said inlet tube into a spiral flow path toward said discharge opening to centrifugally urge particles in said fluid to the outer periphery of said separation chamber while urging said particles axially toward said particle discharge opening, means defining a particle receiving chamber communicating with said separation chamber through said particle discharge opening, means for establishing a continuous controlled flow of fluid through said particle discharge opening into said receiving chamber to remove particles from said separation chamber, said controlled flow being limited to a minor portion of the flow of fluid into said separation chamber to thereby establish a forwardly directed helical flow of fluid along the inner periphery of said separation chamber to the open front end of said outlet tube, a plurality of radially extending straightening vanes supported upon and extending between said central baffle and the front end of said outlet tube, and spiral rib means on said inlet tube extending throughout the length of said frusto-conical section of said inlet tube and projecting into said separation chamber for maintaining particles adjacent the outer periphery of said chamber in axial movement toward said particle discharge opening.

References Cited in the file of this patent
UNITED STATES PATENTS

| | | |
|---|---|---|
| 1,170,438 | Fahrney | Feb. 1, 1916 |
| 1,743,522 | Bull | Jan. 14, 1930 |
| 2,010,128 | Arnold | Aug. 6, 1935 |
| 2,320,343 | Bailey | June 1, 1943 |
| 2,322,414 | Bowen | June 22, 1943 |
| 2,480,379 | Newberry | Aug. 30, 1949 |
| 2,515,894 | Polk | July 18, 1950 |
| 2,647,588 | Miller | Aug. 4, 1953 |
| 2,806,551 | Heinrich | Sept. 17, 1957 |

FOREIGN PATENTS

| | | |
|---|---|---|
| 891,452 | France | Dec. 11, 1943 |
| 943,392 | France | Oct. 4, 1948 |
| 676,231 | Great Britain | July 23, 1952 |
| 701,593 | Great Britain | Dec. 30, 1953 |
| 713,930 | Great Britain | Aug. 18, 1954 |